3,226,431
X-RAY CONTRAST AGENT

Ernst Felder and Davide Pitré, Milan, Italy, assignors to Bracco Industria Chimica S.p.A., Milan, Italy
No Drawing. Filed May 17, 1961, Ser. No. 110,647
Claims priority, application Germany, June 21, 1960, B 58,278
3 Claims. (Cl. 260—519)

The present invention relates to a new X-ray contrast agent. Particularly the present invention relates to a new compound, the α-(3-acetylamino-2,4,6-triiodophenoxy)-caproic acid of the formula

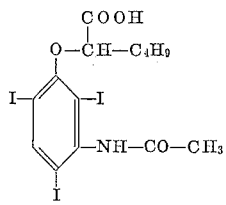

and to non-toxic metal and amine salts thereof, preferably the sodium salt and alkanolamine salts, such as for example the N-methylglucamine salt.

This caproic acid derivative has proved to be a very valuable contrast agent for the gall bladder with very good compatibility. The α-(3-acetylamino-2,4,6-triiodophenoxy)-caproic acid is very quickly and completely resorbed from the gastrointestinal tract, so that the X-ray exposures of the gall bladder are possible 4 hours after the peroral application, for example of the sodium salt of the said acid, and produce excellent sharp images which are not impaired by any disturbing shadows from the intestinal region.

This is an essential advantage over the prior known gall contrast agents.

The invention also includes the process for the production of the compounds provided by the invention and with a good yield and high degree of purity, which is surprising for the triiodized compound of complex structure.

The process of the invention comprises triiodizing 3-acetaminophenol with an excess of iodine chloride, the iodizing agent advantageously being used in the complex form as alkali iodine dichloride, and condensing the 3-acetyl-amino-2,4,6-triiodophenol, which is obtained, with a reactive acid ester, for example a hydrohalic acid ester, the methanesulphonic acid ester or p-toluenesulphonic acid ester of α-hydroxycaproic acid or a low alkyl ester thereof, to form the α-(3-acetylamino-2,4,6-triiodophenoxy)-caproic acid or a low alkyl ester thereof and if necessary saponifying the ester group and thereafter converting the α-(3-acetylamino-2,4,6-triiodophenoxy)-caproic acid into a form suitable for use as an X-ray contrast agent.

The condensation is advantageously carried out with a low α-halocaproic acid alkyl ester, for example with an α-bromocaproic acid alkyl ester or an α-chlorocaproic acid alkyl ester, the condensation preferably taking place in the presence of an alkali alcoholate, such as for example sodium ethylate. The saponification of the ester group which follows the condensation is carried out by conventional methods. It is, however, necessary to avoid saponification of the 3-acylamino group, which is best hindered by saponifying the ester group in alkaline solution.

The compound according to the invention can be used in the form of the free acid or preferably in the form of one of its salts. It is dispensed in tablet form, and an inert carrier such as for example the starch or sugar is added. However, it can also be dispensed as a granulate in the form of capsules or in liquid form as a suspension or solution. The best results in clinical trials were noted, when the compound was dispensed in the form of its sodium salt in gelatine capsules.

The effective dose is between approximately 2 and 5 grammes of effective substance, but usually 3 grammes of the latter are used.

The invention is further illustrated by the following examples:

EXAMPLE

(a) 3-acetylamino-2,4,6-triiodophenol 16 parts by weight of 3-acetylaminophenol were suspended in 8000 parts by volume of water. While stirring vigorously, 375 parts by volume of normal $KICl_2$ solution were run in at room temperature. The mixture was stirred for 2 hours and then the precipitate which formed was suction-filtered, washed with acidified sodium-hydrogen sulphite solution and reprecipitated from dilute sodium hydroxide solution with hydrochloric acid. M.P.: 208° C.

In order to remove any possible small impurities of 3-acetylamino-4,6-diiodophenol, the reprecipitated product can be dissolved in 200 parts by volume of 0.5-normal sodium hydroxide solution and 150 parts by volume of saturated common salt (NaCl) solution can be added. After a certain period of time, the sodium salt of 3-acetylamino-4,6,-diiodophenol was seperated out and removed by filtration after standing for 24 hours. The filtrate had normal hydrochloric acid solution added thereto, whereupon pure 3-acetylamino-2,4,6-triiodophenol with a melting point of 207 to 209° C. precipitated.

The yield was 45 to 47 parts by weight, that is to say, about 83% of the theoretical.

(b) α-(3-acetylamino-2,4,6-triiodophenoxy)-caproic acid ethyl ester 53.8 parts by weight of 3-acetylamino-2,4,6-triiodophenol were added to a solution of 2.7 parts by weight of sodium in 125 parts by volume of ethanol. After a clear solution had formed, 22.3 parts by weight of α-bromocaproic acid ethyl ester were added and the mixture was stirred for 4 hours while boiling under reflux.

The precipitated sodium bromide was filtered off, the filtrate concentrated by evaporation in vacuo and the residue stirred into water. The precipitation which had formed was then separated out, washed with sodium carbonate solution and thereafter repeatedly with water. After, if necessary, repeating recrystallization from a small quantity of ethanol, the α-(3-acetylamino-2,4,6-triiodophenoxy)-caproic acid ethyl ester obtained in a good yield melts at 115 to 117° C.

This new ester is insoluble in water and diethylether, but soluble in warm benzene and chloroform, readily soluble in methanol, warm ethanol and warm acetic acid.

As well as being recrystallized from ethanol, the resulting ester can also be recrystallized for example from benzene or chloroform.

By substitution of the α-bromocaproic acid ethyl ester in the foregoing example by 293 parts by weight of α-bromocaproic acid methyl ester the α-(3-acetylamino-2,4,6-triiodophenoxy)-caproic acid methyl ester was obtained in good yield. This ester is insoluble in water and diethylether, but readily soluble in methanol and warm acetic acid.

(c) α-(3-acetylamino-2,4,6-triiodophenoxy)-caproic acid 35 parts by weight of the α-(3-acetylamino-2,4,6-triiodophenoxy)-caproic acid ethyl ester obtained according to the above Example b) or 34 parts by weight of the α-(3 - acetylamino - 2,4,6 - triiodophenoxy) - caproic acid methyl ester were saponified by boiling for 4 hours in a solution of 6 parts by weight of sodium hydroxide in 100 parts by volume of 80% aqueous ethanol. A clear solution of the sodium salt is formed. This solution was concentrated by evaporation in vacuo.

The evaporation residue was poured into water. The somewhat cloudy solution which thereby formed was filtered and the filtrate was acidified with 10% aqueous hydrochloric acid solution until the congo reaction was acid. The product was in this case almost quantitatively precipitated.

After working up and recrystallizing the product from acetic acid or suspension in hot ethyl acetate, a pure α-(3-acetylamino-2,4,6-triiodophenoxy)-caproic acid with a melting point of 182 to 184° C. (with decomposition) was obtained. This new caproic acid derivative is insoluble in water and diethylether, soluble in cold methanol and ethanol, readily soluble in warm methanol and ethanol.

(d) Salts of α-(3-acetylamino-2,4,6-triiodophenoxy)-caproic acid (1) Sodium salt: This was obtained for example by dissolving the free acid in the calculated quantity of the 2 to 8 normal sodium hydroxide solution and precipitating the salt, for example with ethanol.

The solubility of the salt is 32 g./100 cc.

(2) N-methyl glucamine salt: This salt is fairly readily soluble in water and in fact 64 g. thereof dissolve in 100 cc.

The oral toxicity of α-(3-acetylamino-2,4,6-triiodophenoxy)-caproic acid corresponds substantially to that of the gall contrast agent usually employed at the present time, namely of the α-ethyl-β-(2,4,6-triiodo-3-aminophenyl) propionic acid, if the latter is administered in the micro-crystalline form in which it can be most satisfactorily resorbed.

The compound according to the present invention is however resorbed substantially more satisfactorily and quickly than the aforesaid prior known compound, as has been shown by determining the quantity of iodine in the gall. Four hours after the oral administration of 3 g. of sodium salt of α-(3-acetylamino-2,4,6-triiodophenoxy)-caproic acid to the unprepared patient, the desired contrasts have been developed and the X-ray exposures can be made. The X-ray exposures can be repeated 5, 6 and 8 hours after the application. It is thus possible for the waiting time between administration of the contrast agent and the X-ray exposure to be substantially shortened by comparison with the prior known gall contrast agents. It has been shown by the exposures that there are practically no residues of the preparation in the intestine.

The preparation has also proved to be very compatible in the extensive clinical tests. No secondary effects such as for example vomiting, diarrhea and hyperperistalsis, caused by the administration of the contrast agent were observed.

EXAMPLES OF TYPES OF PREPARATIONS (1) Tablets 0.75 kg. of maize starch are added to and mixed with
5.00 kg. of sodium salt of α-(3-acetylamino-2,4,6-triiodophenoxy)-caproic acid (see Example d), and
0.75 kg. of coarse sugar (saccharose).

The mixture is moistened with 1000 cc. of 50% aqueous alcohol and then granulated in the machine, i.e., dried in a current of air at a temperature of 40 to 50° C. The dry granulate is screened, 0.70 kg. of maize starch, 0.05 kg. of talcum and 0.05 kg. of magnesium stearate are added thereto and compressed to form 10,000 tablets.

The tablets are intended for oral cholecystography, and generally 6 tablets are dispensed.

(2) Granulate.—Composition of a dose for administration 3 g. of sodium salt of α-(3-acetylamino-2,4,6-triiodophenoxy)-caproic acid,
4.8 g. of fine sugar,
0.05 g. of carboxymethyl cellulose,
0.025 g. of polyhydroxymethylene stearate,
0.08 g. of orange essence.

The above substances are weighed out in the indicated mixing ratio, moistened with alcohol and then granulated in the machine.

(3) Effervescing granulate.—Composition of a dose for administration 3 g. of sodium salt of α-(3-acetylamino-2,4,6-triiodophenoxy)-caproic acid,
3.375 g. of tartaric acid,
0.0122 g. of polyhydroxy stearate,
0.0122 g. of sodium laurin sulphonate,
3 g. of fine sugar,
2.25 g. of sodium carbonate.

The above substances are weighed out in the indicated mixing ratio, moistened with alcohol and granulated in the usual manner, and naturally no water may be used.

(4) Capsules (each with 0.750 g. of active substance)

750 g. of sodium salt of α-(3-acetylamino-2,4,6-triiodophenoxy)-caproic acid,
600 g. of sesame oil, and
100 g. of vegetable lecithin are stirred to form a paste and used as a filling in 100 gelatine capsules.

These capsules are intended for oral cholecystography and generally four capsules are used per patient.

(5) Capsules (each with 0.50 g. of active substance)

Exactly 0.5 g. of sodium salt of α-(acetylamino-2,4,6-triiodophenoxy)-caproic acid is used as the filling in one half of a gelatine capsule and the other half of the capsule is then fitted on top thereof. Both halves are then united and sealed to form a gelatine capsule.

The dose for administration is generally 6 capsules.

(6) Clysma (for use in pediatry)

A dose has for example the following composition:

1.5 g. of sodium salt of α-(3-acetylamino-2,4,6-triiodophenoxy)-caproic acid,
50 g. of sodium chloride solution (0.5%).

The sodium salt of the α-(3-acetylamino-2,4,6-triiodophenoxy)-caproic acid is dissolved in the indicated quantity of sterilized sodium chloride solution and the solution is thereafter ready for use.

Instead of the sodium salt of the α-(3-acetylamino-2,4,6-triiodophenoxy)-caproic acid, it is also possible for the N-methyl glucamine salt of the same acid to be used.

We claim:
1. A compound selected from the group consisting of the compound of the formula

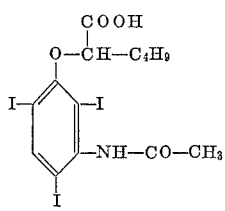

the sodium salt, and the N-methyl glucamine salt thereof.
2. α-(3-acetylamino-2,4,6-triiodophenoxy)-caproic acid.
3. The sodium salt of the α-(3-acetylamino-2,4,6-triiodophenoxy)-caproic acid.

References Cited by the Examiner

UNITED STATES PATENTS

| | | | |
|---|---|---|---|
| 2,085,009 | 6/1937 | Dalmer et al. | 260—519 |
| 2,485,146 | 10/1949 | Foster | 260—521 |
| 2,653,901 | 9/1953 | Harvill | 167—82 |
| 2,685,553 | 8/1954 | Carroll et al. | 167—82 |
| 2,868,818 | 1/1959 | Pfister et al. | 260—519 |

LORRAINE A. WEINBERGER, *Primary Examiner.*

CHARLES B. PARKER, *Examiner.*

G. P. D'ANGELO, L. A. THAXTON,
*Assistant Examiners.*